United States Patent [19]

Galbato

[11] Patent Number: 4,664,538
[45] Date of Patent: May 12, 1987

[54] SEALED BEARING ASSEMBLY

[75] Inventor: Anthony T. Galbato, Jamestown, N.Y.

[73] Assignee: Trw Inc., Cleveland, Ohio

[21] Appl. No.: 849,177

[22] Filed: Apr. 7, 1986

[51] Int. Cl.$^4$ .................. F16C 33/78; F16C 33/76
[52] U.S. Cl. ................................. 384/477; 384/478; 384/486
[58] Field of Search ............... 384/477, 478, 481, 482, 384/484, 486, 607

[56] References Cited

U.S. PATENT DOCUMENTS

| | | | |
|---|---|---|---|
| 1,420,416 | 6/1922 | Dlesk | 384/477 |
| 2,110,864 | 3/1938 | Batesole | 308/187.2 |
| 2,353,988 | 7/1944 | Batesole et al. | 286/11 |
| 2,530,052 | 11/1950 | Firth | 288/3 |
| 2,639,954 | 5/1953 | Potter | 308/187.2 |
| 2,734,757 | 2/1956 | Martin | 286/5 |
| 2,850,792 | 9/1958 | Cobb | 29/143.4 |
| 2,879,114 | 3/1959 | Bowen | 308/187.2 |
| 2,888,304 | 5/1959 | Kooistra | 308/187.2 |
| 2,917,328 | 12/1959 | Peterson | 286/5 |
| 3,144,280 | 8/1964 | Sorenson | 308/36.1 |
| 3,245,735 | 4/1966 | Sikora | 308/187.1 |
| 3,306,223 | 2/1967 | Liebig | 103/111 |
| 3,346,307 | 10/1967 | Harrington | 308/187.1 |
| 3,363,911 | 1/1968 | McKinven, Jr. | 277/65 |
| 3,627,390 | 12/1971 | Irwin | 308/187.1 |

FOREIGN PATENT DOCUMENTS

| | | | |
|---|---|---|---|
| 613996 | 2/1961 | Canada | 384/484 |
| 168092 | 1/1986 | European Pat. Off. | 384/477 |
| 675386 | 5/1939 | Fed. Rep. of Germany | 384/477 |
| 3320063 | 12/1984 | Fed. Rep. of Germany | 384/477 |

Primary Examiner—Stuart S. Levy
Assistant Examiner—Thomas R. Hannon
Attorney, Agent, or Firm—Eugene E. Renz, Jr.

[57] ABSTRACT

An anti-friction bearing assembly including an outer race ring and an inner race ring coaxially located in radially spaced relationship with rolling elements positioned therebetween. Circumferential shoulders are formed on the inner ring member at locations axially outward of the rolling elements. Flinger rings are carried on the ends of the inner race ring axially outward of the shoulder and each has a first circumferentially continuous flange portion which extends radially at a location axially outwardly of the outer race ring. A second flange portion extends from the first flange portion axially inward into engagement with the associated circumferential shoulder to limit axial movement of the flinger ring member during assembly and use. Carried by the outer race ring at locations axially inward of each flinger ring is a seal ring having a circumferentially continuous web which terminates in a free end portion carrying a resilient seal member. The resilient seal member has spaced terminal end portions extending into sealing engagement with the first and second flange portions of the associated flinger ring. The bearing assembly is mounted in a support housing which includes surfaces aligned with the flinger rings and inclined to direct particles impelled by the flinger rings in a direction away from the bearing assembly.

11 Claims, 3 Drawing Figures

4,664,538

SEALED BEARING ASSEMBLY

BACKGROUND OF THE INVENTION

The subject invention is directed toward the art of bearings and, more particularly, to an anti-friction bearing having an improved seal arrangement.

The invention is especially suited for use in drive shaft hanger bearings and will be described with reference thereto; however, as will become apparent, the invention is capable of broader application and could be incorporated in a variety of types of bearings used in many different environments.

Drive shaft hanger bearings are often used in environments which subject the bearing to significant concentrations of foreign particles such as dust and dirt. Many different bearing designs and seal structures have been proposed to seal the critical bearing components from the effects of such particles. Typically, however, the prior designs and structures have been unduly expensive and/or complex, or have been deficient in one or more areas.

In addition to the above, such bearings are frequently subject to impact by solid and liquid particles which can damage the seal members. Even in those designs which include "slinger" or "flinger" members to deflect the particles away from the bearing, surrounding bearing mounting structure or associated components are often located such as to redirect the deflected particles into the bearing. Moreover, problems were sometimes encountered in assembling such slinger members to the bearing in proper relationship with the seals.

The subject invention overcomes the foregoing problems and others, and provides a sealed bearing structure which is especially suited for use in contaminated environments or in environments where the bearing is likely to be impacted by foreign particles.

SUMMARY OF THE INVENTION

In accordance with the subject invention, a new anti-friction bearing is advantageously provided. The construction of the bearing includes an outer race ring having an axial length W and an inner race ring having an axial length $W_1$ located coaxially within the outer race ring in radially spaced relation therewith to define an annular space. Rolling elements are positioned in the annular space between the race members, and a circumferential shoulder is formed on the inner ring member at a location axially outward of the rolling elements. A flinger member is mounted on the inner race member at a location axially outward of the shoulder, and has a first circumferentially continuous flange portion which extends radially outwardly at a location axially inwardly of an axial end of the outer ring member. A second flange portion is joined to the first flange portion and extends axially inward into engagement with the circumferential shoulder to limit axial inward movement of the flinger member during assembly or use. A seal ring member is carried by the outer race member at a location axially inward of the flinger ring member, and has a circumferentially continuous web which extends generally toward the juncture between the first and second flange portions of the flinger ring. The seal ring terminates in a free end portion spaced from the juncture and a resilient seal member is joined to the free end of the web, and has a pair of lip portions extending into sealing engagement with the first and second flange portions of the flinger ring member.

In accordance with a more limited aspect of the invention, the outer race ring is carried in a support housing having a width greater than $W_1$ and a surface generally radially aligned with the first flange portion of the flinger ring. Preferably, the surface is inclined in a direction axially away from the flinger ring.

As is apparent from the foregoing, the shoulder on the inner race ring positively locates the flinger member relative to the associated structure. The inclined nature of the housing surface and its relation to the flinger member assures that any particles thrown radially by the flinger member are directed axially away from the bearing.

The seal structure is such that the sealing of the interior of the bearing is accomplished by a primary sealing lip and a radially outward spaced sealing lip with each of the lips being in engagement with a separate portion of the flinger ring member. In addition, the design of the web portion of the seal ring is such that an increased lubricant carrying capacity is provided by the structure.

Accordingly, a primary advantage of the invention is the provision of a bearing structure which is particularly suited for use in highly contaminated environments.

A further advantage of the invention resides in the provision of a bearing of the general type described wherein the flinger or rotor elements are positively located and controlled by shoulders formed in the inner bearing race.

Yet another advantage is found in the provision of a bearing of the general type described which is arranged so that particles thrown outwardly by the flinger or bearing rotor are directed generally away from the bearing structure.

Still other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF A PREFERRED EMBODIMENT

Figures 1, 2, 3:
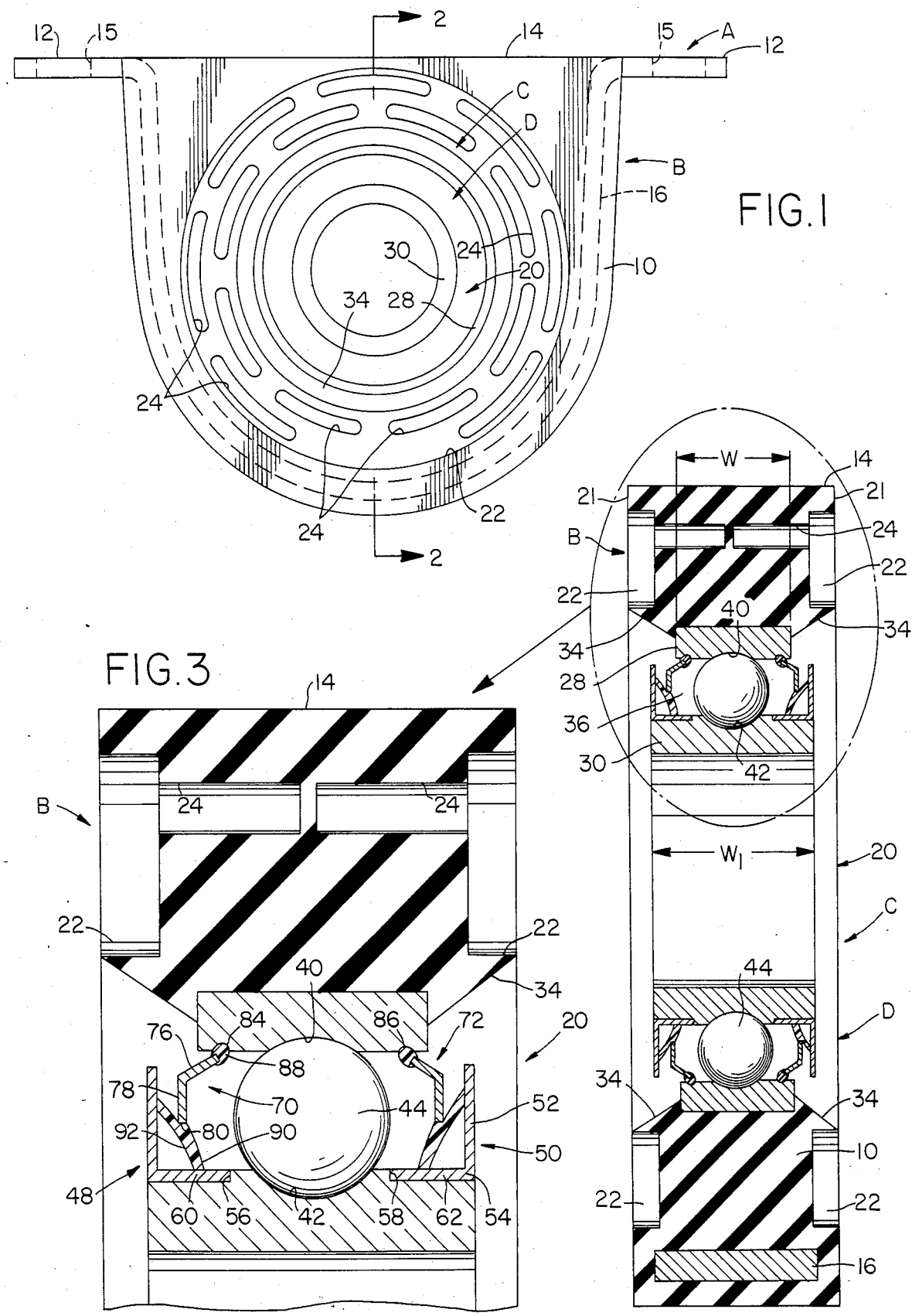
FIG. 1 is a side elevational view of a drive shaft hanger bearing formed in accordance with the invention.
FIG. 2 is a cross-sectional view taken generally along lines 2—2 of FIG. 1; and, FIG. 3 is a greatly enlarged view of the circled portion of FIG. 2 for ease of appreciating the structure of the invention.

Referring more particularly to the drawings wherein the showings are for the purpose of illustrating a preferred embodiment of the invention only and not for the purpose of limiting same, FIGS. 1 and 2 show the overall arrangement of a hanger bearing assembly A including a support housing B which carries the bearing C and its associated seal structure D.

In the preferred embodiment shown, the support housing B preferably comprises a generally U-shaped main body 10 provided with mounting flanges or legs 12 formed to extend laterally outward therefrom. The upper surfaces of flanges 12 are generally in alignment with the flat upper, mounting surface 14 of housing body 10. In addition, suitable mounting openings 15 are formed through flanges 12 to allow the assembly to be conveniently connected to a suitable support structure.

As is apparent, the main body 10 of housing B could be formed from a variety of materials and have a configuration different from that shown; however, in the embodiment under consideration the main body is desirably molded from a suitable, relatively rigid, elastomeric material such as a high strength plastic or hard rubber. The support flanges or legs 12 are the terminal ends of a preformed flat metal bar or strip 16 which is preferably preformed and integrally molded within the main body.

Anti-friction bearing assembly C is axially received and held within an opening 20 formed centrally through housing B. Formed circumferentially about opening 20 on both lateral sides 21 of the housing B are inwardly extending recesses 22. A plurality of arcuate grooves or recesses 24 extend inwardly from the bottoms of recesses 22 as best shown in FIGS. 2 and 3. The purpose of the recesses 22 and 24 is to provide the housing with some additional resiliency and to reduce the overall weight of the assembly.

As previously noted, the anti-friction bearing assembly C is mounted centrally within the housing B in the opening 20. In the preferred embodiment here under consideration, the bearing C is shown as a single row, ball bearing assembly including an outer bearing race ring 28 and an inner bearing race ring 30. Outer race ring 28 is preferably formed of a suitable metal bearing alloy. Ring 28 is mounted centrally within opening 20, and is positively and non-rotatably joined to the main body 10 of housing B. Specifically, ring 28 is permanently molded within main body 10.

As shown in FIGS. 2 and 3, ring 28 has a width W which is preferably significantly less than the thickness of main housing body 10. Additionally, the ring is located midway between the lateral side faces 21 of the housing body 10. As shown, the housing body desirably includes inclined faces 34 which are formed circumferentially about outer race ring 28 and extend in a direction radially outward of opening 20 for reasons which will subsequently be discussed.

The inner ring 30 is also formed of a suitable bearing ring material. It is, of course, located coaxially with ring 28 and is spaced inwardly thereof to define the annular space 36. Preferably, for reasons which will subsequently become apparent, the inner ring 30 has a width $W_1$ which is substantially greater than the width W of outer ring 28, but at least slightly less than the axial thickness of main body 10.

Outer and inner race rings 28, 30 are provided with conventional raceway grooves 40, 42, respectively. Suitable sets of bearing balls 44 are received within the space 36 for a rolling engagement with grooves 40, 42.

Of importance to the subject invention is the bearing seal assembly D and its relationship to the bearing C and the housing B. In particular, as can best be seen in FIGS. 2 and 3, seal assembly D is shown as comprising a first pair of seal rotor rings 48 and 50, often referred to as "slinger" or "flinger" rings. In the embodiment illustrated, each of the seal rotor rings 48, 50 are preferably of identical shape and configuration. Accordingly, only one of the rings will be described in detail, it being appreciated that the other ring is identical thereto unless otherwise specifically noted. In particular, the seal rotor ring 48 is circumferentially continuous and has a generally L-shaped cross-section with a first portion 52 extending radially outward from a second, integrally formed, generally cylindrical portion 54. Preferably, the seal rotor members 48, 50 are formed from a suitable metal and have their cylindrical portions 54 firmly press fit to the laterally opposite ends of the inner race ring 30.

In accordance with the invention, and with particular reference to FIG. 3, the inner race ring 30 is provided with radially extending shoulders 56 and 58. These shoulders are preferably defined by circumferential continuous grooves or recesses 60, 62 ground or otherwise formed in the circumferential outer periphery adjacent each end. The recesses 60, 62 extend axially inward of the ring a distance substantially equal to the length of the portions 54 of the bearing seal rotors 48, 50. The shoulders 56, 58 thus provide a positive stop to assure precise spacing and location of the rotor rings during assembly of the bearing. In addition, the shoulders act to maintain the location and spacing of the rings should the rings be subjected to impact during installation or use of the bearing.

Seal assembly D further includes a pair of seal rings 70, 72 which are carried by the outer race ring 28. In the preferred embodiment, the rings 70, 72 are of identical construction. Accordingly, only the ring 70 will be described in detail and the description thereof should be considered as equally applicable to ring 72 unless otherwise specifically noted. As illustrated, ring 70 is formed as a thin, relatively resilient, imperforate metal web comprising joined sections 76, 78. Both sections 76 and 78 are circumferentially continuous and extend completely around the bearing. First section 76 has a generally truncated conical configuration and is integrally joined to the disc shaped second section 78. Section 78 terminates in a radially inner free edge or end 80.

Preferably, the seal rings 70, 72 are firmly but resiliently retained in position in the outer race ring 28 by being received in respective grooves 84, 86. Grooves 84, 86 are formed circumferentially about the interior of ring 28 at the locations best shown in FIG. 3. In addition, the rings 70 and 72 have a bead or enlargement 88 formed from nytrile rubber or the like molded or otherwise bonded circumferentially about the outer periphery of section 76. The bead 88 is sized so as to be closely and resiliently received in the respective groove or recess 84.

The seal rings 70, 72 are desirably oriented in the manner shown in FIG. 3. It is to be noted that the seal rings are positioned to extend generally toward the juncture between the portions 52, 54 of their respective rotor ring member 48, 50. In addition, the web section 78 extends generally parallel to the associated rotor ring portion 52. This provides a somewhat hip-shaped space between the race rings 28, 30. The arrangement thus increases the space available for receipt of grease or other suitable lubricants.

The actual sealing between the seal rings 70, 72 and their respective rotor ring members 48, 50 is accomplished to resilient lip seals 90, 92 which are formed from nytrile rubber or other suitable resilient, resinous material. Preferably, seals 90, 92 are molded and bonded directly to the free end 80 of the web 74. As shown, lip 90 is arranged to be directed generally toward the radial outer surface of rotor ring portion 54 and circumferentially engage it with a moderate contact pressure. Lip 90 thus serves as the primary seal for chamber 36. Lip 92, on the other hand, serves as a secondary seal and resiliently engages the axial inner surface of the associated rotor ring portion 52. Lip 92 functions to reduce the likelihood of environmental impurities entering into the area adjacent lip 90.

Referring again to the rotor ring members 48, 50, it will be noted that their respective portions 52 are sized so as to extend outwardly substantially the full radial width of the space 36 and provide significant protection for the seal rings 70, 72. Additionally, it should be noted that the portions 52 are located axially outward of the ends of race ring 28 and are directed toward the inclined body surfaces 34. Consequently, during rotation of the inner race ring, impurities impinging on the rotor rings are directed radially outward to deflect off body surfaces 34 and away from the seal rings 70, 72.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An anti-friction bearing including:
   an outer race ring having an axial length W; an inner race ring having an axial length $W_1$ located coaxially within the outer race ring in radially spaced relationship to define an annular space;
   a support housing for mounting the outer race therein having a width greater than $W_1$;
   rolling elements positioned in said annular space;
   a circumferential shoulder formed on said inner ring member at a location axially outward of said rolling elements;
   a flinger ring member carried on said inner race member at a location axially outward of said shoulder and having a first circumferentially continuous flange portion extending radially outward at a location axially outward of an axial end of said outer ring member and a second flange portion joined to said first flange portion and extending axially inward into engagement with said circumferential shoulder to limit axial inward movement of said flinger ring member;
   a seal ring member carried by said outer race member at a location axially inward of said flinger ring member and having a circumferentially continuous web which extends generally toward the juncture between the first and second flange portions of said flinger ring member and terminates in a free end portion spaced from said juncture;
   a resilient seal member joined to the free end of said web and having terminal end portions extending into sealing engagement with the first and second flange portions of said flinger ring member;
   and, said support housing having a surface generally radially aligned with said first flange portion of said flinger ring and inclinded in a direction axially away from said flinger ring.

2. The anti-friction bearing of claim 1 wherein said circumferential shoulder is located axially inward of an end of said inner race ring a distance substantially equal to the length of the second flange portion of said flinger ring member.

3. The anti-friction bearing of claim 1 wherein said first flange portion is planar and extends generally perpendicular to the axis of said inner race ring.

4. The anti-friction bearing of claim 1, wherein said first flange portion extends radially outwardly to substantially the full radial width of the annular space between the race rings.

5. The anti-friction bearing of claim 1 wherein said outer race ring has a circumferential groove which receives the outer periphery of said seal ring.

6. The anti-friction bearing of claim 1 wherein said web includes a free end portion which extends generally parallel to said first flange portion of said flinger member and is located radially inward of the outer periphery of the first flange portion of said flinger member.

7. An anti-friction bearing including:
   an outer race ring; an inner race ring located coaxially within the outer race ring in radially spaced relationship to define an annular space;
   a support housing for mounting the outer race therein having a width greater than $W_1$;
   rolling elements positioned in said annular space;
   a circumferentially continuous shoulder formed on said inner ring member at a location axially outward of said rolling elements by a recess extending axially inward from an end of said inner ring member;
   a flinger ring member carried on said inner race member at a location axially outward of said shoulder and having a first circumferentially continuous flange portion extending radially outward at a location axially outward of an axial end of said outer ring member and a second flange portion joined to said first flange portion and extending axially inward into engagement with said circumferential shoulder to limit axial inward movement of said flinger ring member;
   a seal ring member carried by said outer race member at a location axially inward of said flinger ring member and having a circumferentially continuous web which terminates in a free end portion spaced from said flinger ring member;
   a resilient seal member joined to the free end of said web and having terminal end portions extending into sealing engagement with the first and second flange portions of said flinger ring member;
   and, said support housing having a surface generally radially aligned with said first flange portion of said flinger ring and inclined in a direction axially away from said flinger ring.

8. The anti-friction bearing of claim 7 wherein said circumferential shoulder is located axially inward of an end of said inner race ring a distance substantially equal to the length of the second flange portion of said flinger ring member.

9. The anti-friction bearing of claim 8 wherein said first flange portion is planar and extends generally perpendicular to the axis of said inner race ring.

10. The anti-friction bearing of claim 7, wherein said first flange portion extends radially outwardly to substantially the full radial width of the annular space between the race rings.

11. An anti-friction bearing including:
    an outer race ring having an axial length W; an inner race ring having an axial length $W_1$ located coaxially within the outer race ring in radially spaced relationship to define an annular space;

a support housing for mounting the outer race therein;

rolling elements positioned in said annular space;

a circumferential shoulder formed on said inner ring member at a location axially outward of said rolling elements;

a flinger ring member carried on said inner race member at a location axially outward of said shoulder and having a first circumferentially continuous flange portion extending radially outward at a location axially outward of an axial end of said outer ring member and a second flange portion joined to said first flange portion and extending axially inward into engagement with said circumferential shoulder to limit axial inward movement of said flinger ring member;

a seal ring member carried by said outer race member at a location axially inward of said flinger ring member and having a circumferentially continuous web which extends generally toward the juncture between the first and second flange portions of said flinger ring member and terminates in a free end portion spaced from said juncture; and, a resilient seal member joined to the free end of said web and having terminal end portions extending into sealing engagement with the first and second flange portions of said flinger ring member;

and, said support housing having a surface generally radially aligned with said first flange portion of said flinger ring and inclined in a direction axially away from said flinger ring.

* * * * *